C. F. LOCHOW.
DISH WASHING MACHINE.
APPLICATION FILED MAY 21, 1920.

1,397,767.

Patented Nov. 22, 1921.
2 SHEETS—SHEET 1.

INVENTOR.
Curt F. Lochow.
BY
Fred P. Gorin
ATTORNEY.

C. F. LOCHOW.
DISH WASHING MACHINE.
APPLICATION FILED MAY 21, 1920.
1,397,767.
Patented Nov. 22, 1921.
2 SHEETS—SHEET 2.
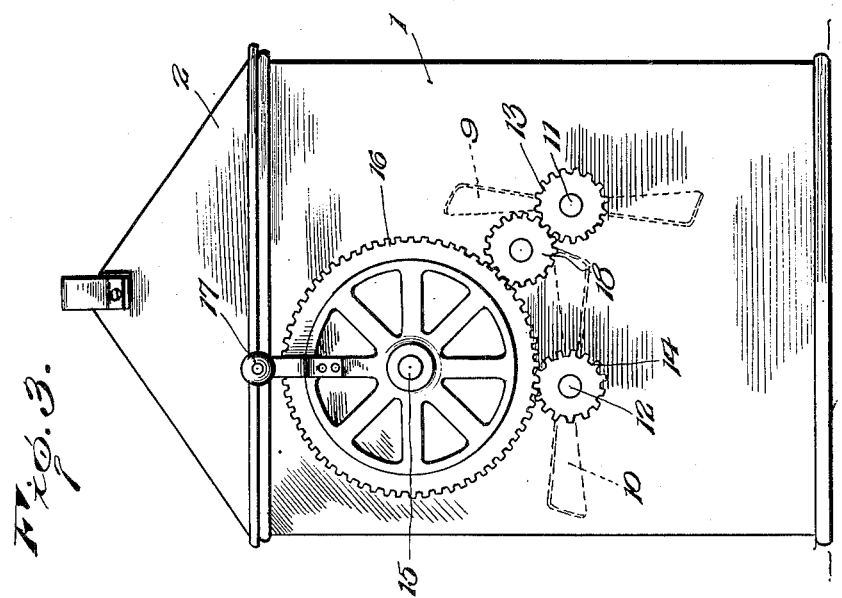
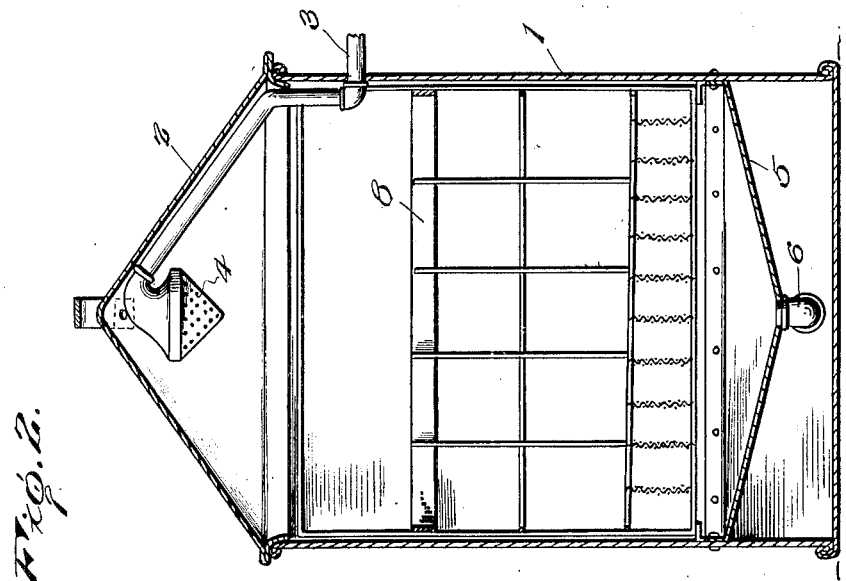
INVENTOR.
Curt F. Lochow.
BY
ATTORNEY.

UNITED STATES PATENT OFFICE.

CURT F. LOCHOW, OF SEATTLE, WASHINGTON.

DISH-WASHING MACHINE.

1,397,767. Specification of Letters Patent. Patented Nov. 22, 1921.

Application filed May 21, 1920. Serial No. 383,163.

*To all whom it may concern:*

Be it known that I, CURT F. LOCHOW, a citizen of the United States, and residing at Seattle, in the county of King and State of Washington, have invented certain new and useful Improvements in Dish-Washing Machines, of which the following is a specification.

This invention relates to an improvement in washing machines, designed particularly to provide a machine of this type which may be readily used in the household, and in which the water is so directed within the machine as to secure a speedy and effective cleaning of the articles placed in the machine.

The invention comprises a casing adapted to receive and support a container in which the articles to be washed are placed. The machine is provided with a water inlet so arranged as to direct the initial flow of water directly onto the article; there being provided additional means by which the water accumulated in the machine is effectively forced through the articles, to insure a thorough cleansing of the same.

The invention is shown in the accompanying drawings, in which:—

Fig. 2 is a similar view, the section being at right angles to that of Fig. 1.

Fig. 3 is a side elevation of the machine.

Figure 1:
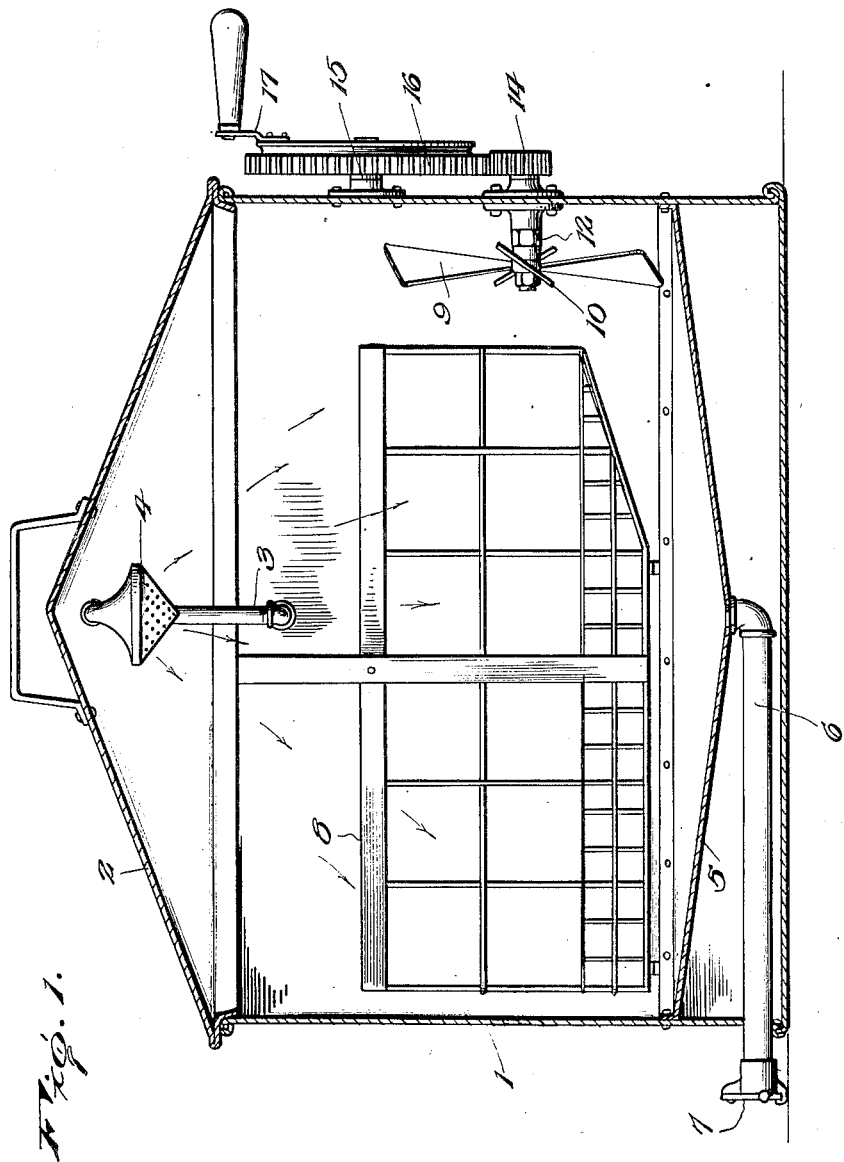
Figure 1 is a vertical section partly in elevation of the improved machine.

The improved machine comprises a casing 1 of appropriate size provided with a removable and preferably conical cover 2. An inlet pipe 3 enters through one side wall of the machine and is there deflected upwardly, following the line of the cover, and terminates in the upper portion of the cover in a downwardly directing broad spray nozzle 4.

Supported within the casing near the bottom thereof, is a concaved bottom 5 from the center or lower portion of which leads a drain pipe 6. The drain pipe extends through and beyond the wall of the casing and may be provided with a suitable cut-off 7, whereby the drain outlet may be closed.

An article receptacle 8 is adapted to be supported within the casing, resting upon the bottom 5, this receptacle 8 is preferably in the form of an open work basket, provided with a beveled bottom portion 8', in which the articles to be cleaned are to be placed. By reason of the concavity of the bottom 5 the article basket when in place contacts with said bottom merely at the edge of said basket, thereby providing an open space around and beneath the basket.

A washing fluid agitating means is mounted within the casing comprising propeller blades 9 and 10 mounted upon shafts 11 and 12, extending through the casing and provided with pinions 13 and 14 respectively. A shaft 15 is mounted upon the casing and provided on the outer side thereof with a gear 16 having an operating handle 17. The gear 16 directly engages the pinion 13, and also operates the pinion 14 through an intermediate pinion 18.

In the operation of the device sufficient dishes or other articles to be cleaned are placed within the basket 8 to substantially fill the same, and the latter positioned on the bottom 5. Hot water is then admitted through the inlet 3, as by connection with the hot water spigot, and is directed through the nozzle 4 onto the dishes. The casing is substantially filled with water and the propellers operated to agitate the water which will cause a longitudinal circulation through the portion of the basket adjacent the propellers, and by reason of the beveled bottom portion of the article holder and the concave bottom, a circulation will occur under the basket and upward through the rear portion thereof and back over the top portion toward the propellers. The operation of the propellers in opposite directions insures a proper direction of current of the water to insure the best results. The drain pipe may be opened to permit the discharge of dirty water resulting from the washing operation. If desired the drain pipe cut-off and the water inlet may be so regulated that the water discharged is renewed by the incoming water, so that there is a constant stream of fresh water delivered to the casing, continually agitated as described, and discharged following its initial use.

Claim:

A washing machine comprising a casing, a concave bottom inclined downwardly toward the center from all sides, an article receptacle carried in the casing above the bottom and having one end spaced from the end wall of the casing and formed with a beveled bottom portion at this end, a pair of intermeshing oppositely rotating propellers adjacently mounted in the end wall within the casing, the sweep of the propellers embracing substantially the width of the casing, the beveled bottom of the article receptacle and the concave bottom being spaced apart to form a passage for the circulation of part of the water from the propellers under and through the bottom of the basket, returning above the top.

In testimony whereof I affix my signature.

CURT F. LOCHOW.